United States Patent [19]
Tone et al.

[11] Patent Number: 5,279,729
[45] Date of Patent: Jan. 18, 1994

[54] BOBBIN SORTING DEVICE

[75] Inventors: Shoichi Tone; Shinji Noshi; Norio Kubota, all of Kyoto; Noboru Sekitani, Ohtsu; Osamu Nakayama, Kyoto, all of Japan

[73] Assignee: Murata Kikai Kabushiki Kaisha, Kyoto, Japan

[21] Appl. No.: 849,811

[22] Filed: Mar. 11, 1992

Related U.S. Application Data

[63] Continuation of Ser. No. 495,343, Mar. 19, 1990, abandoned.

[30] Foreign Application Priority Data

| Mar. 20, 1989 | [JP] | Japan | 1-66381 |
| May 26, 1989 | [JP] | Japan | 1-60328[U] |
| Jun. 2, 1989 | [JP] | Japan | 1-139172 |
| Jun. 30, 1989 | [JP] | Japan | 1-78225[U] |

[51] Int. Cl.⁵ .............. B07C 5/00; B07C 5/08; B07C 5/342; B65H 49/26
[52] U.S. Cl. .................. 209/556; 209/580; 209/927; 242/35.05 A
[58] Field of Search ............ 242/355 A; 209/556, 209/557, 580, 581, 582, 927

[56] References Cited

U.S. PATENT DOCUMENTS

| 4,278,538 | 7/1981 | Lawrene et al. | 209/580 |
| 4,501,366 | 2/1985 | Thompson | 209/556 |
| 4,576,341 | 3/1986 | Matsui et al. | 242/35.5 A |
| 4,660,370 | 4/1987 | Matsui et al. | 242/35.5 A X |
| 4,681,231 | 7/1987 | Ueda et al. | 242/35.5 A X |
| 4,687,107 | 8/1987 | Brown et al. | 209/556 |
| 4,694,949 | 9/1987 | Nakagawa | 242/35.5 A X |
| 4,792,049 | 12/1988 | Janoick et al. | 209/556 |
| 4,838,019 | 6/1989 | Ueda | 242/35.5 A X |
| 4,913,373 | 4/1990 | Ueda | 242/35.5 A |

*Primary Examiner*—Daniel P. Stodola
*Assistant Examiner*—Michael R. Mansen
*Attorney, Agent, or Firm*—Spensley Horn Jubas & Lubitz

[57] ABSTRACT

A bobbin sorting device including a color sensor for distinguishing trays on which different kinds of bobbins are conveyed, characterized in that a metal plate is attached to each tray having one of different colors, and a detector is provided near the color sensor for detecting the metal plate.

4 Claims, 12 Drawing Sheets

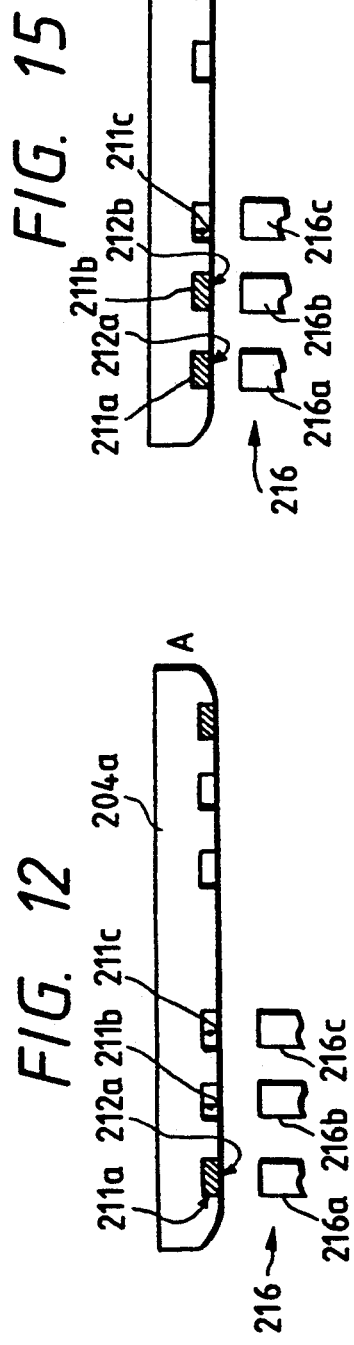
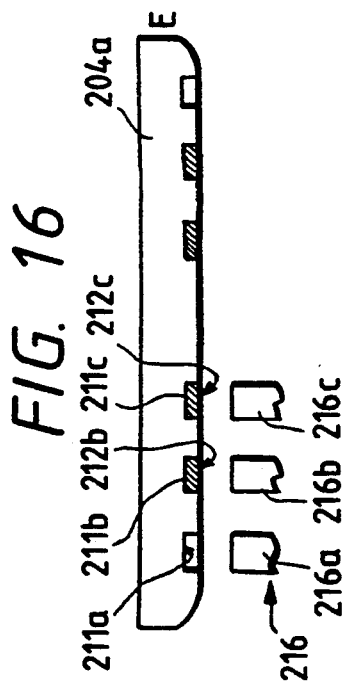
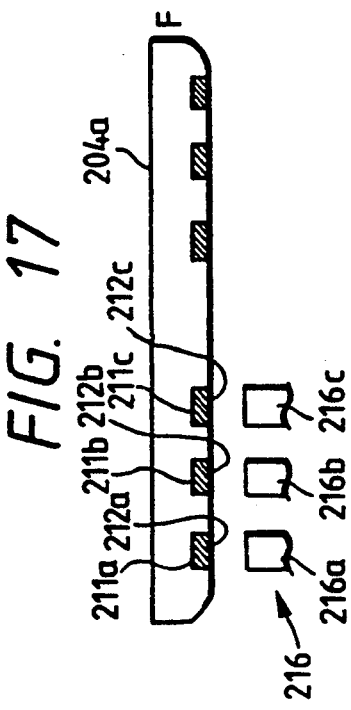
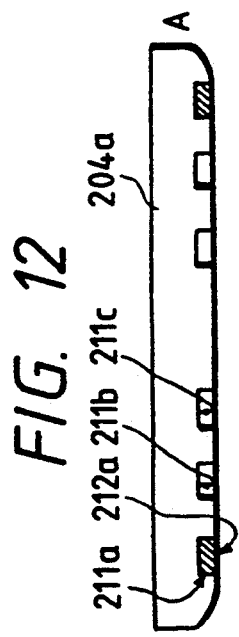
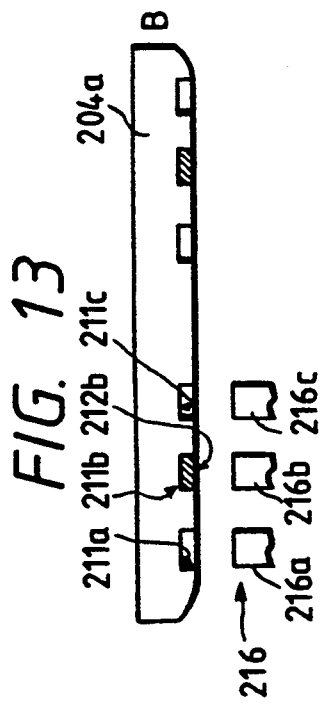
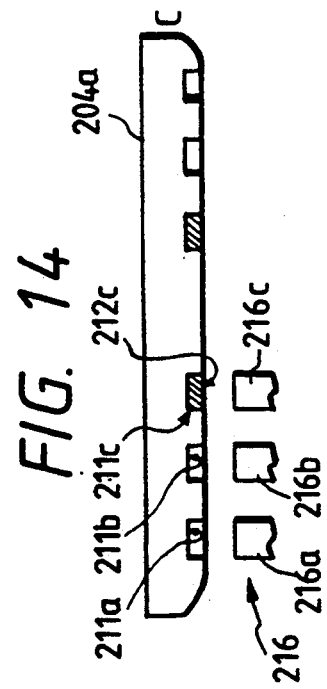

BOBBIN SORTING DEVICE

This is a continuation of application Ser. No. 07/495,343 filed on Mar. 19, 1990, now abandoned.

FIELD OF THE INVENTION

This invention relates to a bobbin sorting device, and more particularly, to a device in which bobbins are sorted based upon the trays on which bobbins are conveyed.

RELATED ART STATEMENT

It is known that different types of bobbins produced by a fine spinning frame may be sorted based upon the trays upon which the bobbins are conveyed.

Referring to FIG. 3, a fine spinning frame not shown is connected to an automatic winder 1 by a path 2 of conveyance which includes a bobbin supply portion 6 lying along one side of the automatic winder 1 having a plurality of winding sections 3, 4 and 5, and a return portion 7 lying along the opposite side of the winder 1 from the bobbin supply portion 6.

Branches 8 are connected to the bobbin supply portion 6 and the junction between the bobbin supply portion 6 and each branch 8 is provided with a groove gauge 10 which distinguishes trays T by the identifying grooves formed thereon, but not shown, so that the trays may be mechanically sorted and distributed to the winding sections 3 to 5. The return portion 7 is provided with a bobbin removing device 11 and a bobbin sorting device 12 is provided near it for sorting the trays T (spun yarn bobbins) in accordance with the kinds of yarns.

The bobbin sorting device comprises a color sensor (mark sensor) for detecting different colors assigned to the trays T for different kinds of yarns.

The bobbins are removed from trays and loaded in each box according to the yarn kinds on detection of the output of the sensor.

As the trays T leave each winding unit, each bobbin on which some yarn remains is directly returned to a yarn end finding device 13 provided in the bobbin supply portion 6, while each empty bobbin, or bobbin on which only a very small amount of yarn remains is removed by the bobbin removing device 11 in a properly sorted way and a full bobbin is in turn delivered to the bobbin supply portion 6.

The repeated use of the differently colored trays T, however, causes certain changes, including staining, change in color, and the adherence of fluff. These changes give rise to an error in the function of the mark sensor.

This is particularly the case when there are, for example, three groups of trays which are black, white and blue, respectively. Although the black and white trays may be easily distinguishable from each other, the distinction of the blue trays having a color between black and white from the black or white one is difficult, or even impossible by an ordinary mark sensor.

OBJECT AND SUMMARY OF THE INVENTION

Under these circumstances, it is an object of this invention to provide a bobbin sorting device which ensures the reliable sorting of bobbins by the colors of trays.

This invention is a bobbin sorting device including a color sensor for distinguishing trays on which different kinds of bobbins are conveyed, characterized in that a metal plate is attached to each tray having a particular color, and that means is provided near the sensor for detecting the metal plate.

The color sensor functions to distinguish the trays from one another by their colors to thereby sort the bobbins. The detecting means detects specific trays having a specific color to sort the corresponding bobbins, irrespective of the correct functioning of the color sensor.

BRIEF DESCRIPTION OF THE DRAWINGS

FIG. 12 to 17 are sectional views, respectively, of trays of different kinds;

DETAILED DESCRIPTION OF PREFERRED EMBODIMENTS

An embodiment of this invention will now be described with reference to the accompanying drawings.

Figure 1:
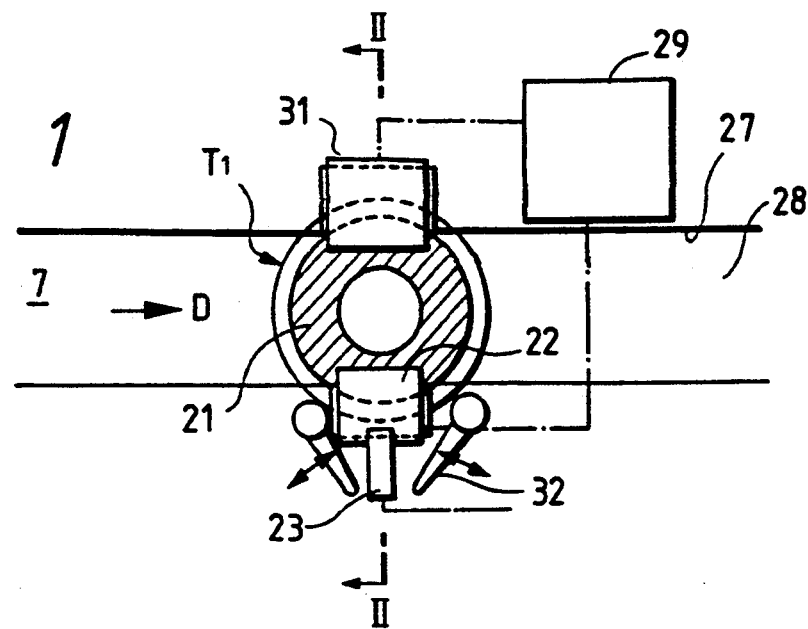
FIG. 1 is a top plan view showing a bobbin sorting device embodying this invention.
Figure 2:
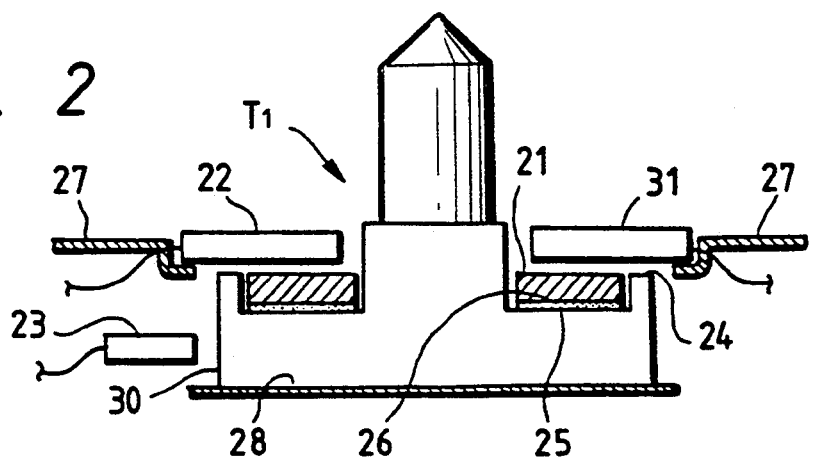
FIG. 2 is a sectional view taken along the line II—II of FIG. 1.

A bobbin sorting device embodying this invention is shown in FIGS. 1 and 2. It is provided in a return path 7 from an automatic winder. No description is repeated of any part that is common to this invention and the prior art, as any such part is shown by the same numeral throughout the drawings.

The bobbin sorting device comprises an iron plate 21 as the metal plate attached to each tray $T_1$ having a specific color, and a proximity switch 22 provided near a mark sensor 23, which constitutes the color sensor, as the means for detecting the presence of the iron plate 21. The device is designed for handling black, white and blue trays T used for conveying three kinds of bobbins A, B and C. Each blue tray $T_1$ carries an iron plate 21.

The iron plate 21 is annular, and the tray $T_1$ has a disk portion formed at its top 24 with an annular recess 25 in which the iron plate 21 is fitted. The iron plate 21 has a bottom surface bonded to the tray $T_1$ with a double-sided adhesive tape 26, and an exposed top surface.

The proximity switch 22 is supported by a guide plate 27 defining the return path 7 so as to face the top 24 of any tray T arriving on a belt conveyor 28. A bobbin removing device 29 serving also as a detecting controller is provided downstream of the proximity switch 22 in the direction D of travel of the belt conveyor 28 for responding to the output signal of the proximity switch 22 to remove a particular bobbin so that it may be replaced by a full bobbin.

The mark sensor 23 is located below the proximity switch 22 so as to face the peripheral surface 30 of a tray T and detect its color. In the device under description, it is designed for distinguishing black and white from each other and delivering information to a tray guide member provided downstream of the mark sensor 23 in the direction D of tray travel, though not shown, so that the trays may be distributed between a station for handling the change of bobbins A and a station for handling the change of bobbins B, which are not shown.

The bobbin sorting device further includes a tray detecting switch 31 of the capacitance type supported on another guide plate 27 lying in parallel to the guide plate 27 on which the proximity switch 22 is supported, and a pair of stoppers 32 provided on both sides, respectively, of the proximity switch 22 for engaging a tray to hold it. The tray detecting switch 31 outputs a signal to the bobbin removing device 29 upon detecting each tray, and ensures that the proximity switch 22 works properly when each arriving tray T has been stopped in its appropriate position.

In operation, each tray T leaving any of the winding sections and carrying a spun yarn bobbin is conveyed along the return path 6 and is stopped by the stoppers 32. As shown in Table 1, the tray detecting switch 31 first detects the presence of any tray T and determines the starting point of the detection process. The mark sensor 23 sorts the trays T by their colors. It distinguishes the trays T clearly by detecting a white tray T, while not detecting a black tray T, so that each tray may be transferred to handling station.

TABLE 1

| Grade | Color | Iron plate | Tray switch | Proximity switch | Mark sensor |
|---|---|---|---|---|---|
| A | Black | Absent | ○ | x | x |
| B | White | Absent | ○ | x | ○ |
| C | Blue | Present | ○ | ○ | ○ x |

○-Detected;
x-Not detected.

Although a blue tray $T_1$ is difficult to distinguish by the mark sensor 23, it is distinguished from any other differently colored tray T by the proximity switch 22 detecting its iron plate 21. The signal from the proximity switch 22 which has detected the blue tray $T_1$ causes the bobbin removing device 29 to operate. The bobbin removing device 29 removes from the tray $T_1$ an empty bobbin for Grade C yarn, or a bobbin on which only a very small amount of yarn remains, so that it may be replaced by a full bobbin formed by the fine spinning frame.

The iron plate 21 attached to each blue tray $T_1$ and the proximity switch 22 provided in addition to the mark sensor 23 ensures the correct sorting of the three different kinds of spun yarn bobbins, irrespective of the staining or other defect of any tray T.

The tray detecting switch 31 determines the time at which the proximity switch 22 will operate, and thereby ensures that the proximity switch operates at the appropriate time for detecting the iron plate.

Although the bobbin sorting device has been described as being employed in the station for handling bobbins for Grade C yarn, it can also be used to make a variety of other sorting and transfer systems including a system in which all of the bobbins are removed from the trays T and the trays T are distributed to the full bobbin supply positions. In any event, the device enables the sorting of three kinds of trays at a single site.

Although the iron plate 21 has been described as being secured to the tray $T_1$ by the double-sided tape, it is also possible to use an adhesive. The iron plate may be replaced by a plate of any other metal, if it can be detected accurately.

Although the device has been described as being used for sorting three kinds of bobbins, the invention can also be used to make a device for distinguishing two kinds of bobbins, for example, bobbins on black and white trays, each black tray carrying an iron plate.

This invention exhibits the excellent advantages as will hereinafter be summarized.

The use of a system as described above, including a metal plate attached to the tray, a means for detecting the metal plate, and a color sensor, ensures that bobbins positioned on such trays may be correctly sorted, regardless of whether such trays are stained or otherwise defective.

Figure 3:
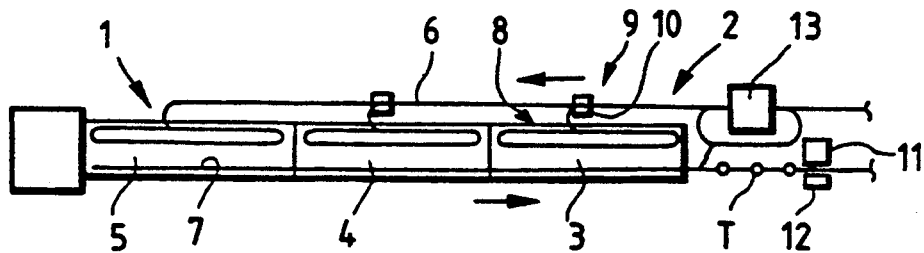
FIG. 3 is a top plan view showing a path of conveyance associated with an automatic winder and used for explaining a conventional bobbin sorting device.

Another embodiment of a tray selecting means provided at a branch 10 portion shown in FIG. 3 will be now described.

In an attempt to meet the recent requirement for the production of various kinds of wound packages each in a small lot, we, the applicants of this application, have proposed a "System for the Transfer of Different Kinds of Bobbins" which comprises a plurality of branches of a path of bobbin supply which are connected to a plurality of winding sections, respectively, of an automatic winder for supplying appropriately selected spun yarn bobbins to those winding sections, as disclosed in Japanese Patent Application laid open under No. 17464/1984.

We have also proposed a sorting device which relies upon trays for its sorting of bobbins to ensure the correct guiding to each branch in the bobbin transfer system of one and the same kind of bobbins from the main path extending from the fine spinning frames to the automatic winder and used for conveying all of different kinds of bobbins together ("Bobbin Conveying Trays" as disclosed in Japanese Patent Application laid open under No. 67370/1985).

Figure 7:
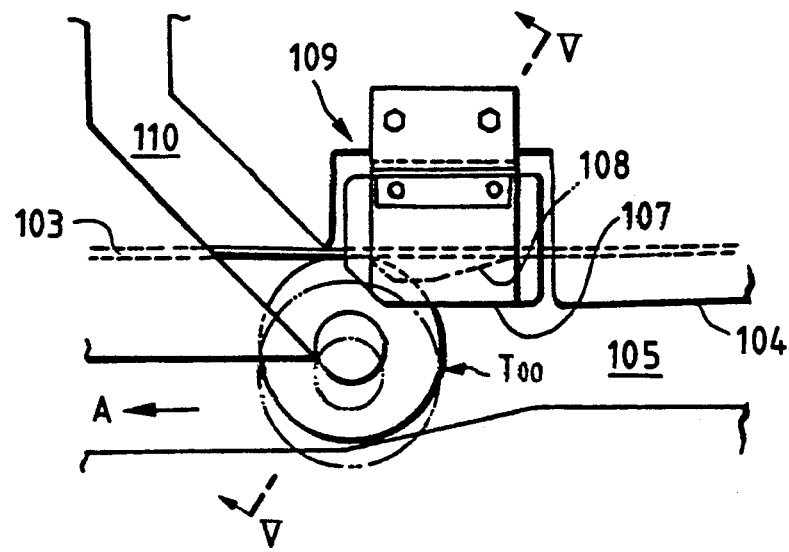
FIG. 7 is a top plan view showing the groove gauge known in the art.
Figure 8:
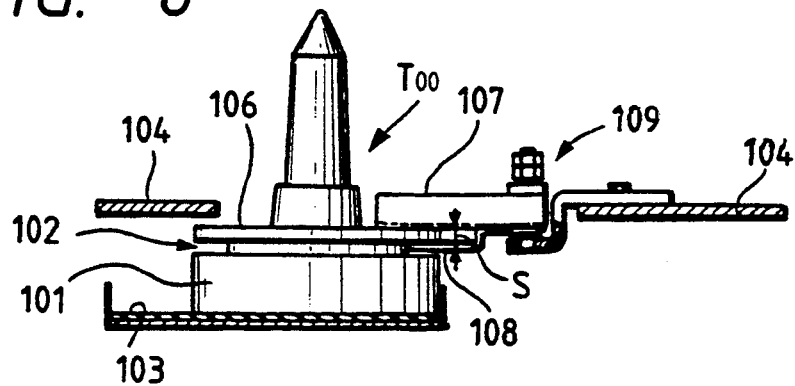
FIG. 8 is a sectional view taken along the line VIII—VIII of FIG. 7.

The proposed sorting device is shown in FIGS. 7 and 8, and includes a groove gauge 109 which is provided in the main path 105 of bobbin supply defined by a belt conveyor 103 and guide plates 104. The groove gauge 109 comprises a reference plate 107 which is engageable with the top surface 106 of the disk-shaped portion of a tray T00, and a selecting plate 108 which is engageable in an identifying groove 102 formed in the peripheral surface 100 of the disk-shaped portion of each of a particular group of trays T00. The reference plate 107 and the selecting plate 108 has therebetween a distance S which is so related to the position of the identifying groove 102 along the height of the disk-shaped portion of the tray T00 that only each tray T00 (spun yarn bobbin) having an identifying groove 102 may be guided to a branch 110 of the path of bobbin supply connected to a winding section not shown, while a tray T00 not having any identifying groove 102 is pushed away toward the downstream portion of the main path 105 in the direction A of conveyor travel, as shown by a two-dot chain line in FIG. 7.

Thus, the device enables the sorting and distribution of bobbins of different kinds of yarns by employing a plurality of groups of different trays T having differently positioned identifying grooves 102 for different kinds of bobbins if a plurality of groove gauges 109 corresponding in position to the grooves 102 are provided in front of a plurality of branches 110, respectively.

There is, however, a limit to the possible height of the peripheral surface 101 of any tray T. This limitation restricts the positional differentiation of the grooves 102 from one group of trays to another. It may be possible to employ, for example, three groups of trays each having an identifying groove 102 adjacent to the top, mid-portion, or bottom of its peripheral surface 101, and thereby distinguish three kinds of bobbins from one another. The use of more than three groups of trays is, however, likely to cause the erroneous sorting operation of the groove gauges 109, as the grooves 102 of one group of trays are too close to those of another group. As a matter of fact, it has been impossible to employ the device successfully in a production line involving four kinds of different bobbins.

In this connection, one may think of employing trays T each having a higher peripheral surface 101 to thereby realize more groups of trays having differently positioned identifying grooves 102 from one another. This, however, calls for an undesirably great change in design of, for example, the path of bobbin supply. There is also known a mark sensor intended for distinguishing different groups of trays T by the different colors assigned to them for identifying different groups of bobbins. There is, however, every likelihood that the correct function of the sensor may be prevented by the staining, discoloration, or other defect of any tray T.

Under these circumstances, it is an object of this embodiment of the invention to provide a bobbin transfer device which enables the sorting and distribution of more kinds of bobbins than is possible by the known device relying solely upon the identifying grooves for its sorting operation.

The device of this invention comprises a first path of transfer along which trays carrying different kinds of bobbins are conveyed, the path having branches, the trays including trays each having an identifying groove, and trays not having any such groove; a groove gauge or gauges provided at the junction between the first path and each of its branches for engaging the groove to select one kind of bobbins; each of the trays not having any such groove being provided with a metal plate; a second path of transfer extending from the first path; and means provided in the second path for detecting the metal plate to select another kind of bobbins.

The groove gauges cause the trays to leave or follow the first path, depending on the position of the identifying groove on the tray, and thereby sort the bobbins by yarns. The trays which have not been caused by any groove gauge to leave the first path arrive at the detecting means. The detecting means distinguishes each tray carrying a metal plate from the rest and thereby sorts two kinds of bobbins.

Figure 4:
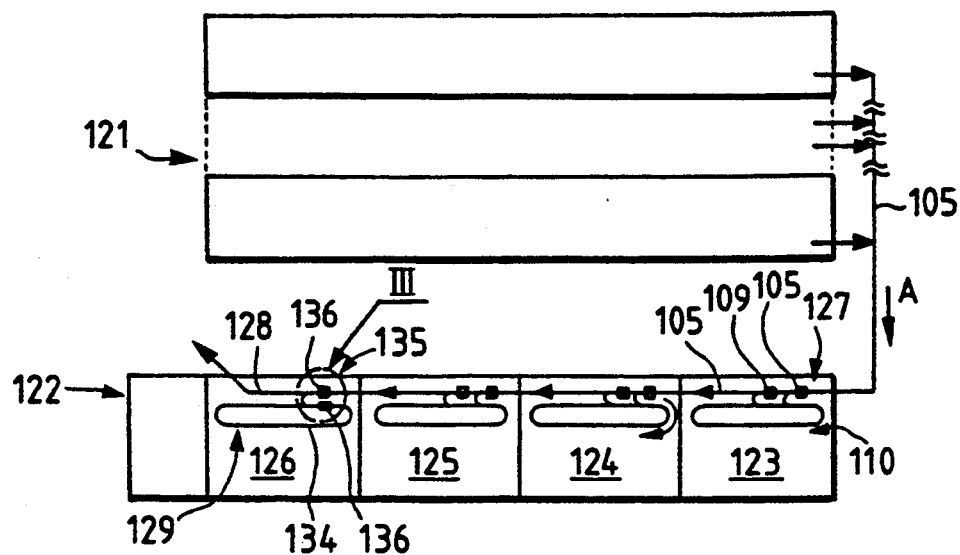
FIG. 4 is a top plan view of the bobbin transfer device embodying this invention.

A bobbin transfer device embodying this invention is shown in FIGS. 4 and 5. It is shown as being used in a transfer line extending from fine spinning frames 121 to an automatic winder 122. No description is repeated of any part that is common to this invention and the prior art, but like numerals are used to denote like parts throughout the drawings.

There are four fine spinning frames 121 juxtaposed for producing four kinds of bobbins of different yarns not shown. They are all connected to a main path 105 of bobbin supply used as the first path of transfer. The automatic winder 122 has four winding sections 123, 124, 125 and 126. The main path 105 extends along the first to third winding sections 123 to 125 as viewed in the direction A of transfer, and has branches 110 connected to the winding sections 123 to 125, respectively, as is the case with the prior art. Groove gauges 109 are provided at each junction between the main path 105 and its branch 110. The last or fourth winding section 126 is provided with a second path 128 of transfer extending from the main path 105 and having a branch 129.

The device is intended for handling four kinds of trays $T_{10}$, $T_{20}$, $T_{30}$ and $T_{40}$ used for carrying four kinds of different bobbins. The trays are shown in FIG. 5. They include three kinds of trays $T_{20}$ to $T_{40}$ each having an identifying groove 102 formed in the peripheral surface 101 of its disk-shaped portion. The trays $T_{20}$ to $T_{40}$ differ from one another in the position of the groove 102, and are shown in FIG. 5 as having a high groove 130, a middle groove 131 and a low groove 132, respectively. None of the remaining group of trays $T_{10}$ has any identifying groove 2, but each tray $T_{10}$ carries an iron plate 133 as the metal plate constituting a salient feature of this invention. The iron plate 133 is fitted in a recess 134 formed in the top surface 106 of the disk-shaped portion of the tray $T_{10}$, and has an exposed top surface.

The groove gauges 109 shown in FIG. 4 are so constructed differently from one another as to be engageable with the identifying grooves 130 to 132, respectively. Means 136 for detecting the iron plates 133 is provided at the junction 135 between the extending path 128 and its branch 129 in the fourth winding section 126. The detecting means 136 determines if any tray $T_{00}$ arriving along the extending path 128 carries an iron plate 133.

The branch 129 includes a loop portion 134 provided for distributing bobbins to different units, not shown, of the automatic winder 122. The loop portion 134 is also provided with detecting means 136. The extending path 128 further extends from the junction 135 to the exterior of the automatic winder 122.

Figure 6:
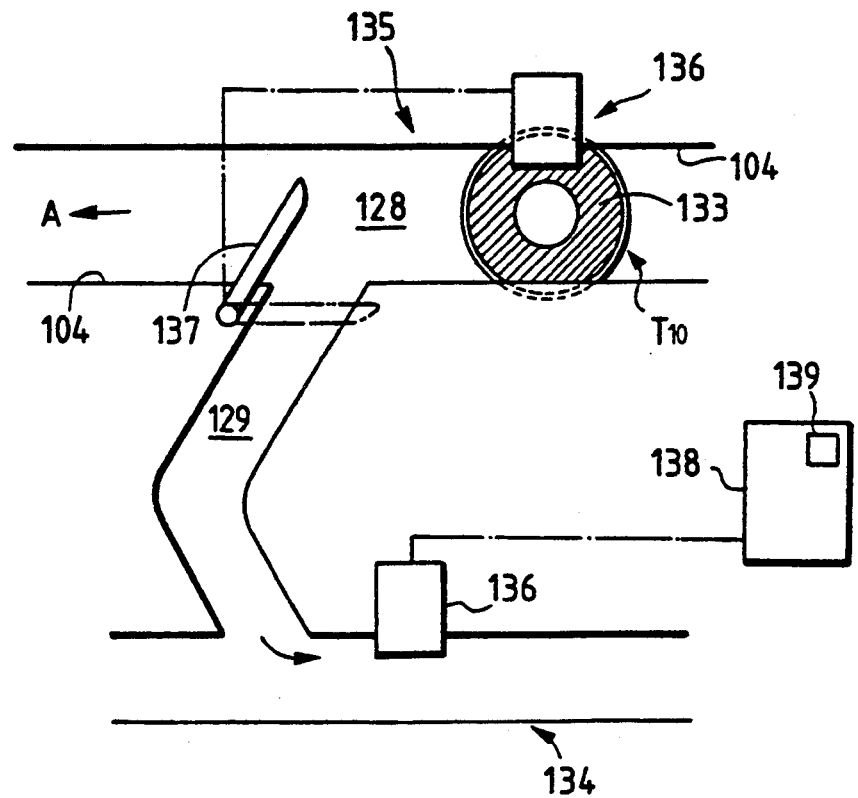
FIG. 6 is an enlarged view of the portion marked III in FIG. 4.
Figure 5A:
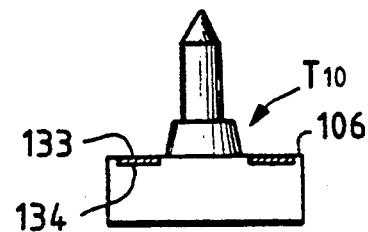
FIGS. 5a, 5b, 5c, 5d are a set of side elevational views of different kinds of trays.
Figure 5B:
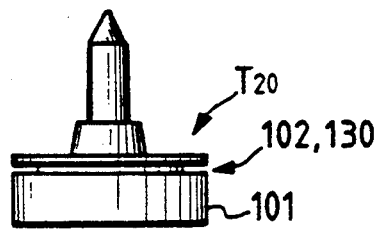
Figure 5C:
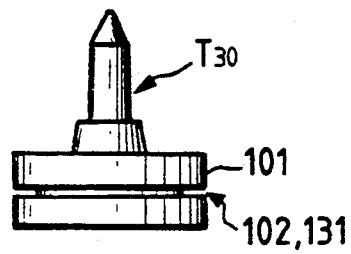
Figure 5D:
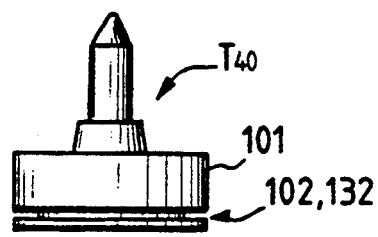

Referring to FIG. 6, each detecting means 136 comprises a proximity sensor which is so supported on the guide plate 104 as to face the top surface 106 of any arriving tray $T_{00}$ to thereby detect its iron plate 133, if any. The detecting means 136 provided at the junction 135 is operationally connected to a guide lever 137 provided downstream of the junction 135 as viewed in the direction A of tray travel along the extending path 128, and transmits a working signal to it.

The guide lever 137 is supported on the guide plate 104 rotatably so as to extend across the extending path 128 or its branch 129. The lever 137 is operable for blocking the path 128 when the detecting means 136 has detected an iron plate 133, or its branch 129 when it has not detected any iron plate, thereby hindering the passage of any tray $T_{00}$ through either of the path 128 and its branch 129 and guiding it to the other.

The detecting means 136 provided in the loop portion 134 is operationally connected to a transfer control device 138 provided for controlling the operation of the belt conveyor 103, etc. It is operable for causing an alarm 139 to function and causing the belt conveyor 103 to stop immediately, if it has not detected any iron plate 133 on any tray T in the branch 129.

In the device under description, an additional junction 127 and an additional groove gauge 109 may be provided for each of the first to third winding sections 123 to 125 to ensure the still more reliable sorting of the trays $T_{20}$ to $T_{40}$.

Description will now be made of the operation of the device as hereinabove described.

As the trays $T_{00}$ leaving the fine spinning frames 121 and carrying bobbins of spun yarns arrive one after another through the main path 105, the trays $T_{20}$ to $T_{40}$ each having an identifying groove 102 are sorted by the groove gauges 109 at the junctions 127 leading to the winding sections 123 to 125 of the automatic winder 122, and are distributed to the corresponding winding units through the corresponding branches 110.

Every tray $T_{00}$ that has been rejected by all of the groove gauges 109 is conveyed along the extending path 128 to the junction 135 leading to the fourth winding section 126. The detecting means 136 determines if it carries an iron plate 133. If it is a tray $T_{10}$ having an iron plate 133, the guide lever 137 blocks the extending path 128 and guides the tray $T_{10}$ to its branch 129.

The tray $T_{00}$ traveling along the branch 129 is examined again by the detecting means 136 in the loop portion 134, and is delivered to the corresponding winding unit. Should it be a tray $T_{00}$ not having any iron plate, the operator of the device will take appropriate measures, including stopping the conveyor system and removing the tray from it.

All of the trays $T_{00}$ from which no iron plate 133 has been detected are allowed to pass through the junction 135 and leave the automatic winder 122.

Thus, the device of this invention relies for its sorting of the trays $T_{00}$ not only for the detection of the identifying grooves 102 by the groove gauges 109 as has hitherto been the case, but also for the distinction of the trays by the iron plates 133. It can, therefore, distinguish more kinds of bobbins than can be distinguished by the identifying grooves 102 alone. For example, it can distinguish four kinds of bobbins if the conventional device has been able to distinguish a maximum of three kinds of bobbins.

The presence of the two detecting means 136 ensures that the inclusion of any undesired bobbin in the fourth winding section 126 be avoided.

The device is preferably provided near each detecting means 136 with a stopper for stopping any arriving tray $T_{00}$ in position and a photoelectric tube for detecting any such tray $T_{00}$ and causing the detecting means 136 to function at an accurate timing, so that the detecting means 136 may work still more reliably to distinguish the trays $T_{00}$, though no such additional device is shown in the drawings. The guide lever 137 may be driven by a combination of a solenoid and a spring which responds to a signal from the proximity sensor.

This embodiment of the invention exhibits the excellent advantages as will be summarized below.

It enables the sorting and distribution of more kinds of bobbins than can be distinguished by the identifying grooves alone, since it includes not only the groove gauges provided at the junctions between the path of bobbin transfer and its branches for distinguishing trays by their identifying grooves, but also the means for detecting the iron or other metal plates on trays not having any such groove and thereby distinguishing the corresponding bobbins from the rest.

Still another embodiment of the tray selecting and identifying system will be illustrated. The tray can transport not only a spinning bobbin but a package and in this embodiment the system is applied to packages.

A conventional cone-to-cone yarn winder rewinds cone or cheese packages automatically supplied thereto into cone packages. The winder of this kind is employed as a rewinder in cleaning dyed packages or in rewinding cheese packages into dyeing packages.

Generally, a package conveying path is connected to the winder, and packages mounted respectively on trays are conveyed along the package conveying path.

Recently, a plurality of kinds of packages are produced in a mill, and conveying paths for simultaneously conveying a plurality of kinds of packages increases with the increase of the kinds of packages. Therefore, the conveying paths are complicated and a large space is necessary for conveying packages. Particularly, when packages of different kinds are handled concurrently on a single winder, the packages of different kinds must be conveyed without being mixed up.

Since packages are mounted respectively on trays, it is possible to identify the packages indirectly through the identification of the trays.

The present device of this embodiment has been made in view of the foregoing circumstances.

In one aspect of the present device, a tray identifying system for identifying trays carrying packages of a plurality of different kinds comprises trays each provided in its lower surface with concentric circular grooves, rings which are to be fitted selectively in the circular grooves, sensors disposed at a tray identifying station at positions corresponding to the circular grooves, respectively, to identify the package through the detection of the presence of the rings in the corresponding circular grooves. A ring or a combination of rings of different diameters, representing the kind of a package is fitted in the corresponding circular groove or grooves of a tray for carrying the package. The ring or the combination of rings is detected at the tray identifying station.

Figure 9:
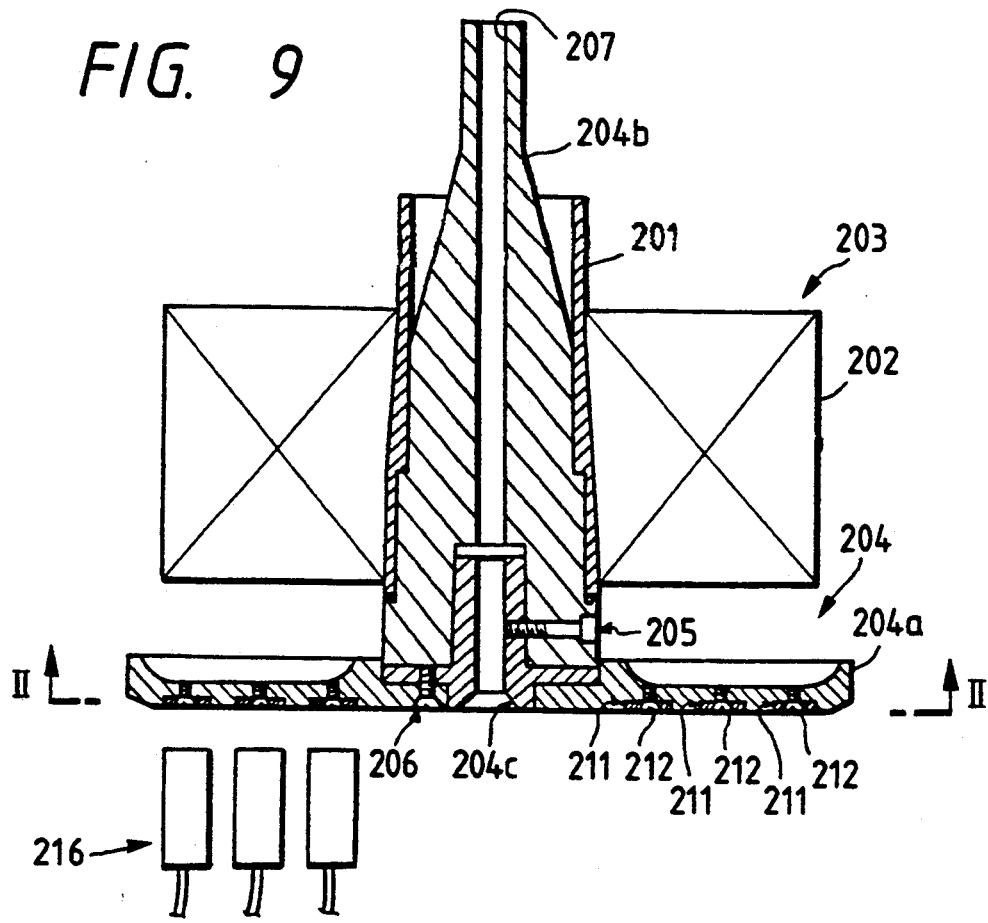
FIG. 9 is a sectional view of a tray identifying system embodying the present device.

FIG. 9 shows a package 203 to be conveyed to, for example, a cone-to-cone winder.

As shown in FIG. 9, the cheese package 203 is formed by winding a yarn 202 on a bobbin 201. The package 203 is mounted on a tray 204 for conveyance on a conveyor belt.

The tray 204 has a plastic base plate 204a having the shape of a disk, and a peg 204b formed integrally with and in the central portion of the base plate 204a so as to be inserted in the bobbin 201. The peg 204b is fastened to a holding member 204c for holding the peg 204b in an upright position with a bolt 205, and the holding member 204c is fastened to the base plate 204a with a bolt 206. The tray 204 is provided with an air passage 207 for finding the leading end of the yarn.

The base plate 204a of the tray 204 is provided with a plurality of concentric circular grooves 211. In the illustrated embodiment, three grooves 211 having a rectangular cross section are formed concentrically.

Metallic rings 212 are fitted detachably in the grooves 211, respectively. The rings 212 are attached selectively to the tray 204 according to the description of the tray 204. Therefore, the rings 212 having a rectangular cross section to be fitted respectively in the grooves 211 are different from each other in diameter. The rings 212 are fitted in or removed from the grooves 211 selectively according to the description of the tray 204.

Figure 11:
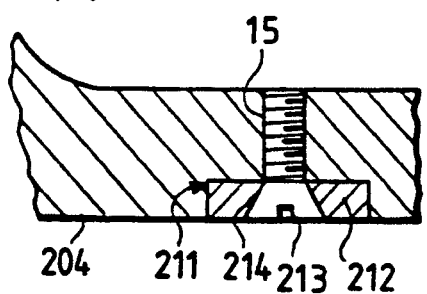
FIG. 11 is an enlarged view of an essential portion of the tray identifying system of FIG. 9.
Figure 10:
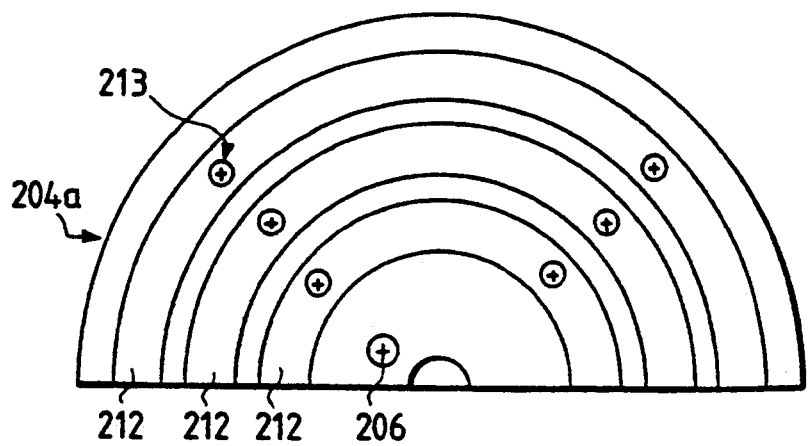
FIG. 10 is a half bottom view taken in the direction of the arrows along line X—X of FIG. 9.

As show in FIGS. 10 and 11, the rings 212 are screwed from the backside of the base plate 204a with screws 213. The screws 213 for fastening each ring 212 are arranged at equal angular intervals. Accordingly, as shown in FIG. 11, the rings 212 are provided with through holes for receiving the screws 213 therethrough, and the base plate 204a is provided with threaded holes 215 engaging the screws 214.

As mentioned above, the tray 204 is conveyed along a conveying path. The description of the tray is identified at a predetermined tray identifying station provided on the conveying path.

A sensor unit 216 for identifying the tray 204 is disposed at the tray identifying station. The sensor unit 216 comprises proximity sensors each disposed so that their sensing head coincide with the corresponding circular grooves 211 to detect the presence of the rings 212 in the circular grooves 211, respectively. The tray 204 is identified by the presence of the rings 212 representing the kind of the tray 204 on the base plate 204a.

The manner of identifying the tray 204 of six kinds, i.e., kinds A to F, will be described hereinafter with reference to FIGS. 12 to 17.

Referring to FIG. 12, a tray 204 of kind A is provided with only a first ring 212a having the largest diameter in the outermost circular groove 211a. At the tray identifying station, the first sensor 216a detects the first ring 212a while the second sensor 216b and the third sensor 216c detect that no ring is present in the second circular groove 211b and the third circular groove 211c, respectively, to identify the tray 204 of kind A.

Referring to FIG. 13, a tray of kind B is provided with only a second ring 212b having an intermediate diameter in the circular groove 211b having an intermediate diameter. Only the second sensor 216b detects the second ring 211b while the other sensors 211a and 211c detect no ring to identify the tray 204 of kind B. Referring to FIG. 14, a tray of kind C is provided only a third ring 212c having the smallest diameter in the circular groove 211c having the smallest diameter. Only the third sensor 216c detects the presence of the third ring 212c while the other sensors 216a and 216c detect no ring to identify the tray 204 of kind C. Thus, the trays 204 of kinds A, B and C are identified each by a single ring 211.

FIGS. 15, 16 and 17 illustrate combinations of the rings 212 having different diameters for identifying trays 204.

Referring to FIG. 15, a tray 204 of kind D is provided with the first ring 212a and the second ring 212b. The sensors 216a and 216b detect the presence of the rings 212a and 212b, respectively, while the sensor 216c detects no ring to identify the tray 204 of kind D.

Referring to FIG. 16, a tray 204 of kind E is provided with the second ring 212b and the third ring 212c. The sensors 216b and 216c detect the presence of the second ring 212b and the third ring 212c, respectively, while the sensor detects no ring to identify the tray 204 of kind E.

Referring to FIG. 17, a tray 204 of kind F is provided with the rings 212a, 212b and 212c. The sensors 216a, 216b and 216c detects the presence of the corresponding rings 212a, 212b and 212c to identify the tray 204 of kind F.

Thus, according to the present device, the trays 204 mounted respectively with packages 203 of different kinds are provided with the rings 212 in their lower surfaces, and the kind of the trays 204 is identified by the rings 212 to prevent the trays 204 of different kinds being mixed up to deal with increase in the kinds of packages.

The present device is applicable also to trays for conveying bobbins produced by fine spinning frames.

As is apparent from the foregoing description, a plurality of kinds are discriminated from each other by using the rings attached to the trays to deal with increase in the kinds of packages.

However, it is impossible to detect a case where a combination of a tray and a bobbin is correct but a separate kind of bobbin is mixed due to inferior operation of a bobbin selector and a case where a different kind of bobbin is carried while being placed on a correct tray because a combination of a bobbin to a tray of a winding section is in error, merely by reading a discrimination mark of the tray by the sensor as in the above-described embodiments. Therefore, even on separate kind of bobbin is wound by the winding section during winding, the wound package will be a defective package, which poses a problem.

In the thus wound package, it is impossible to visually find a mixture of yarns. Accordingly, a mixture of a different kind of yarn is first found by finding a defect appearing in the cloth woven by use of the yarn on this package. Therefore, in the past, as bobbins for bobbin, bobbins of different colors depending on counts of yarns to prevent mixed-count.

However, in the case where a combination of a tray and a bobbin is in error as mentioned above, a different kind of yarn is mixed in the package, and all of doffed packages are defective. In the case where they are not extracted as defective products, the thereafter knitting process is adversely affected.

It is an object of this embodiment of the present invention to solve the above-described problem and provides a mixed-count prevention apparatus which discriminates colors of color bobbins to prevent a mixed-count.

The present invention provides, in a bobbin carrier system in which a number of juxtaposed winding units which constitute a winder are divided into a plurality of winding sections so that plural kinds of yarns are wound by said winding sections, and supplying of bobbins to said winding sections is carried out by a common main carrier line and a circulating distribution passage for each winding section branched from said main carrier line, a mixed-count prevention apparatus comprising, in a bobbin circulating distribution passage in each winding section, a color sensor for detecting colors of color take-up tubes for bobbin, a decision means which provides a signal when a color detected by said color sensor is different from color of a yarn handled by the winding section to which said color sensor belongs, and a means for stopping the operation of the circulating passage of said winding section.

The color sensor detects and monitors a color of a color take-up tube for a bobbin which passes through a bobbin circulating distribution passage of the own winding section. When a color different from a color of yarn handled by the winding section is detected by the color sensor, a signal is provided from the decision means, and the operation of the circulating distribution passage of at least the corresponding winding section is stopped by said signal.

Therefore, even in the case where the bobbin which is of the separate kind for the winding section is carried while being placed on the correct tray for the winding section and the case where the erroneous bobbin for the winding section is carried while being placed on the tray which is in error for the winding section, the operation of the circulating distribution passage is stopped, and therefore, the mixed bobbin can be removed from the tray. Therefore, a trouble in that a separate kind of yarn in a package is mixed and wound may be prevented.

A case where an embodiment of the present invention is applied to a system for supplying and carrying various kinds of bobbins to a peg tray will be described with reference to the drawings.

Figure 18:
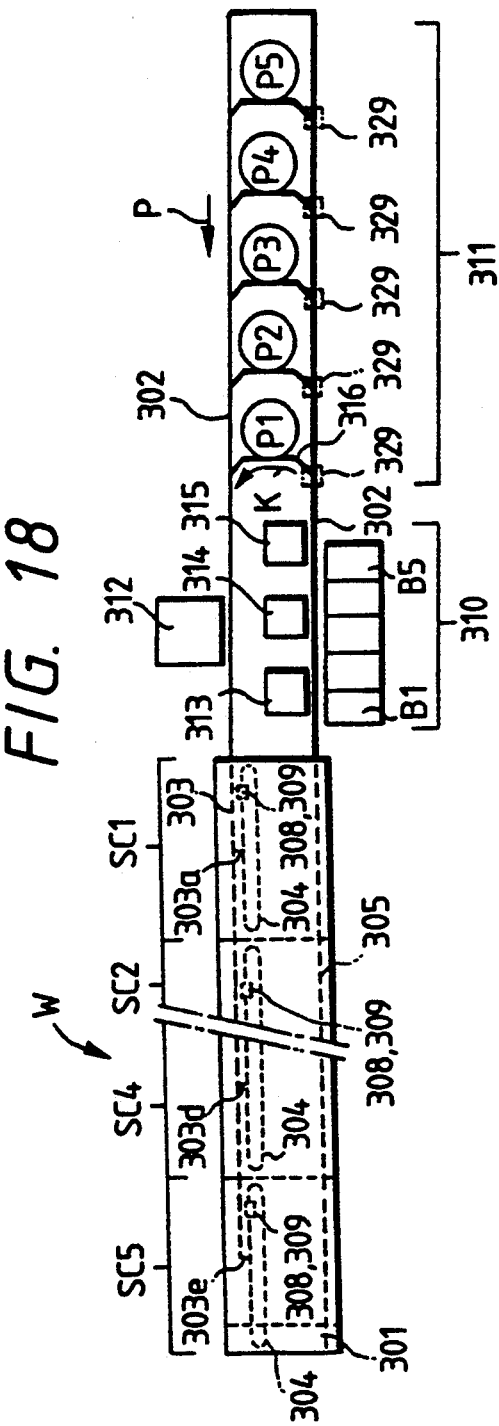
FIG. 18 is a plan layout showing an example of a system provided with a mixed-count prevention apparatus according to the present invention.
Figure 19:
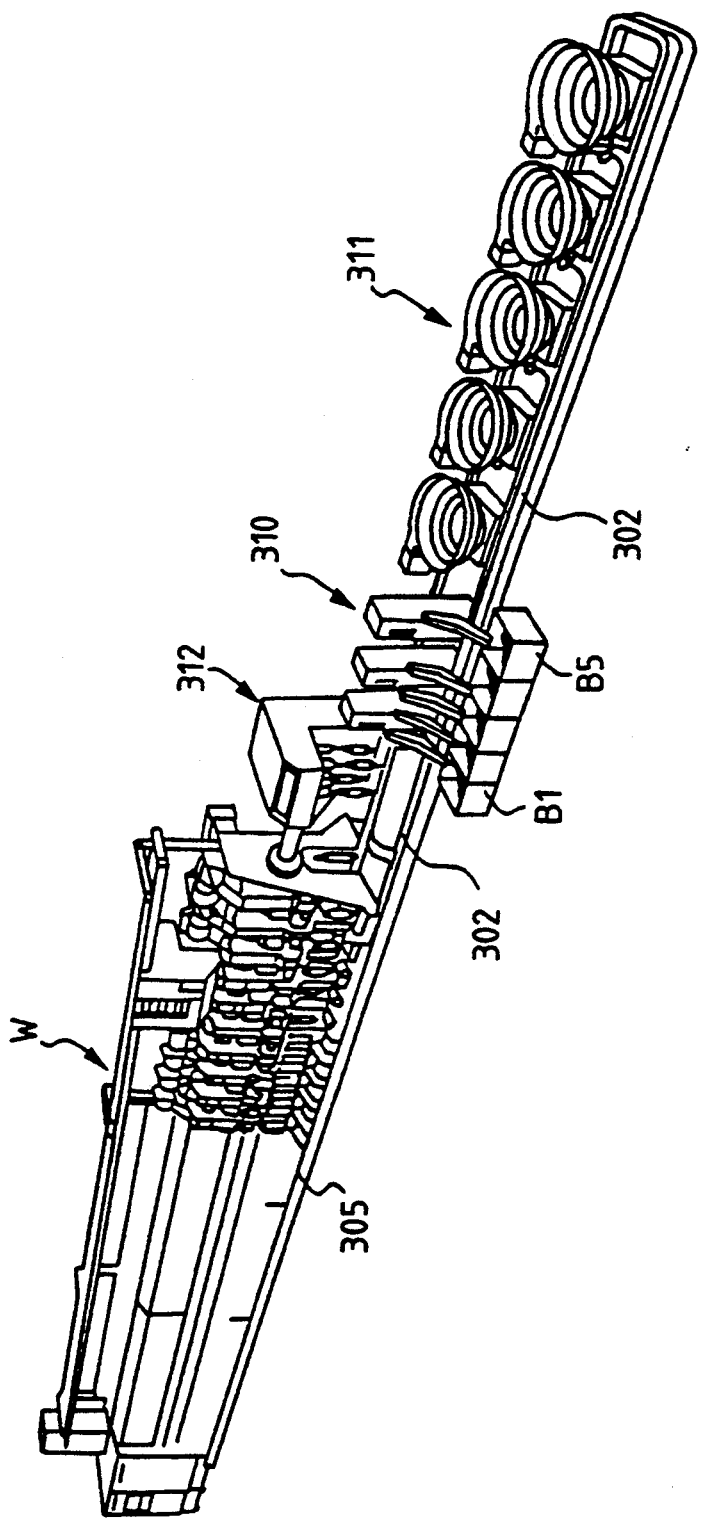
FIG. 19 is a perspective view of the system.

In FIGS. 18 and 19, an automatic winder W is composed of a number of winding units 301 (FIG. 20) juxtaposed. In case of the present invention, the winder is substantially divided into five winding sections SC1 to SC5.

The supply of bobbins to the winder W and the delivery of empty bobbins are carried out by a closed loop main carrier line 302. The opposite ends of the main carrier line 302 is continuous to a bobbin supply passage 303 to the winder W and a bobbin return passage 305, and the bobbin supply passage 303 is connected to a circulating distribution passage 304 exclusively used for the winding sections SC1 to SC5 through branch supply passages 303a to 303e.

Figure 20:
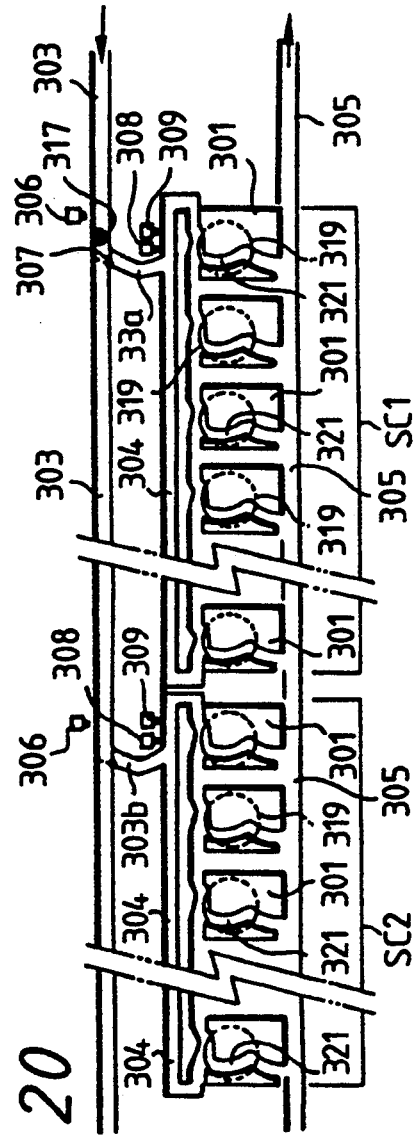
FIG. 20 is a partially enlarged plan view showing the carrier system in a winder portion.

As shown in FIG. 20, a gate 307 is provided at each of branch points from the bobbin supply passage 303 to the branch lines 303a to 303e, and an inlet to the branch lines 103a to 103e is opened and closed by a tray sensor 306 provided immediately before the gate. A mixed-count detector comprising a position sensor 308 and a bobbin color sensor 309 is provided at approximately the midpoint of a circulating distribution passage 304 within each of the winding sections SC1 to SC5.

Along the main carrier line 302 are arranged a bobbin processing zone 310, a bobbin supply zone 311 and a yarn end finding device 312 for bobbins, arranged in order in the direction of travel of a carrier medium (hereinafter referred to as a tray).

In the bobbin processing zone 310, bobbin processing devices 313, 314 and 315 are provided at approximately the midpoint of the main carrier line 302. The bobbin processing device 313 is of the type, which, with respect to two kinds of bobbins a and b, can sort and process empty bobbins and bobbins with an extremely small amount of remaining yarn. The device 314 similarly processes other kinds of bobbins c and d. The device 315 sorts an empty bobbin of the remaining one kind of bobbin and a bobbin with an extremely small amount of yarn.

In the bobbin supply zone 311, branch lines 316 branched from the main carrier line 302 and again joined to the carrier line 302 are provided in the number equal to the number of kinds of bobbins (five in the present embodiment). Bobbin supply stations P1 to P5 are provided halfway of each of the branch lines 316. The stations P1, P2, P3, P4 and P5 supply and mount bobbins a, b, c, d and e, respectively, to trays exclusively used for respective yarns.

The tray having supplied the bobbin in the zone 311, or the tray having the passed bobbin with a remaining yarn is transported in a direction as indicated by arrow P on the main carrier passage 302 and then supplied to the common yarn end finding device 312 for receiving the yarn end finding action, after which various kinds of bobbins are carried in random order on the line 302 toward the winder W.

The bobbins b to e pass through the branch supply passage 303a, and the bobbin d is transported from the branch passage 303d onto a distribution passage 304 of the section SC4. In this manner, the respective bobbins are supplied to predetermined winding sections at which the bobbins are wound.

Figure 21:
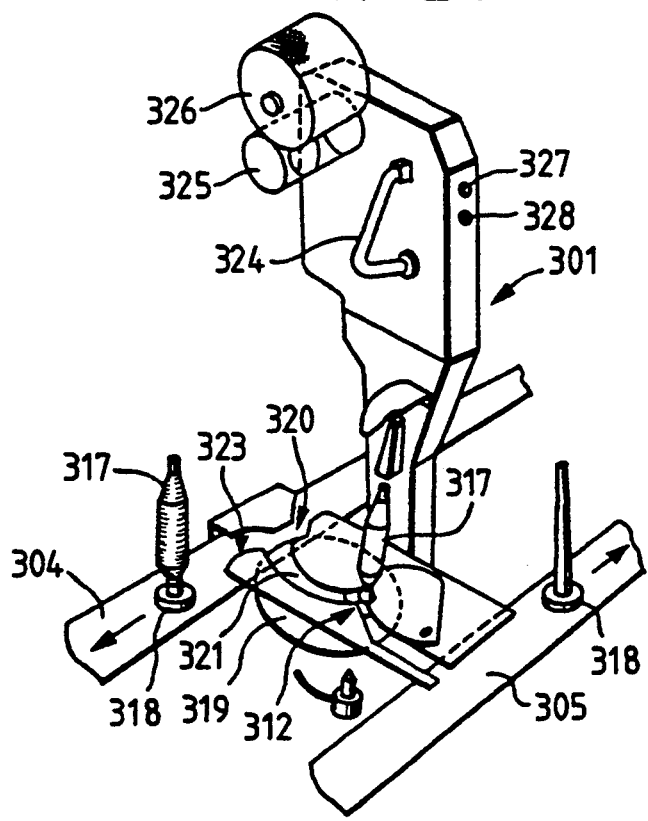
FIG. 21 is a perspective view of a winding unit portion.

In each of the sections, as shown in FIG. 21, a bobbin 317 having moved through the bobbin distribution passage 304 enters a stand-by groove 321 from a bobbin yarn take-in opening 320 and reaches a re-wind position 322 with a tray 318 changed onto a rotary disk 319 of the winding unit 301. In this manner, the succeeding bobbins successively enter the bobbin stand-by groove 325, and the latter is filled with a predetermined number of bobbins, bobbins to be fed thereafter cannot enter the stand-by groove, said bobbin is moved from a surplus bobbin delivery opening 323 toward the next winding unit. In this manner, trays with bobbin mounted successively from the winding unit closest to the yarn end finding device 312 are filled. When an empty or vacancy occurs in the bobbin standby groove 321, said empty is filled in order from the closest winding unit.

The bobbin 317 at the rewinding position 322 sucks and holds a yarn end blown up by a relay pipe 324 which stands-by at an upper level, and turns upward and is guided into a piecing device. A yarn end on the side of a package 326 rotated by a traverse drum 325 and a yarn end on the side of the bobbin 317 are spliced, and rewinding starts.

If the yarn joining fails, the joining operation is again automatically started. However, if the joining continuously fails predetermined times, for example, three times, a yellow button 327 projects and the winding unit 301 stops its operation. Reference numeral 328 denotes a start switch after the package 326 has been doffed.

In FIGS. 18 and 19, various kinds of empty bobbins, bobbins with an extremely small amount of yarn and bobbins with a remaining yarn discharged at random onto the bobbin return passage 305 from the winding sections SC1 to SC5 of the winder W are transported onto the main carrier line 302. First, in the bobbin processing zone 310, the bobbins with an extremely small amount of yarn and empty bobbins are removed from the trays and put into boxes B1 to B5, along the line 302.

Accordingly, among various trays having passed through the bobbin processing zone 310, empty trays without bobbin or trays having bobbins with a remaining yarn capable of being again supplied to the winder are carried.

When the trays reach the bobbin supply zone 311, trays of the kinds belonging to the respective stations P1 to P5 are taken into the branch line 316, depending on the height position of an annular groove provided in the peripheral surface of the tray, by means of a tray sorting device 329 provided on the inlet side of each of the branch lines 316, and then transported toward the bobbin supply stations P1 to P5. When the tray reaches a predetermined position of the station, the tray is stopped by a stopper not shown. After the presence of the tray and the absence of a bobbin on the tray have been confirmed by the sensor, the bobbin supply devices in the stations P1 to P5 advance one cycle. A new bobbin on a conveyor position upwardly, is supplied to and mounted on an empty tray. When the bobbin is mounted, a sensor for confirming the presence or absence of an upper bobbin indicates the presence of a bobbin, and the stopper is released. The tray with the bobbin mounted thereon is further transported on the branch line 16 in a direction indicated by arrow k. The branch line 16 joins the main carrier line 302 and the tray with the bobbin mounted thereon is transported toward the yarn end finding device 312 on the line 302. When a bobbin with a remaining yarn is present on the tray at the bobbin supply stations P1 to P5, the tray moves toward the yarn end finding device without being supplied with a bobbin.

In this manner, the tray with bobbin mounted thereon is transported on the carrier passage 302 and supplied to the yarn end finding device 312 where the yarn end is found, which is then carried toward the winder W.

In the winder W, various trays carried at random on the main supply line 302 shown in FIG. 18 are transported through the branch supply passages 303a to 303e to the closed loop-like bobbin distribution passage 304 within each of the winding section SC1 to SC5. On the inlet side of the branch passages 303a to 303e is provided a tray sensor 306 comprising a magnetic cord and a proximity switch or a reflecting plate cord and a photo-sensor so that specific trays or bobbins discriminated by the tray sensor 306 are automatically sorted and supplied to a specific winding section according to the opening and closing of the gate 307.

Figure 22:
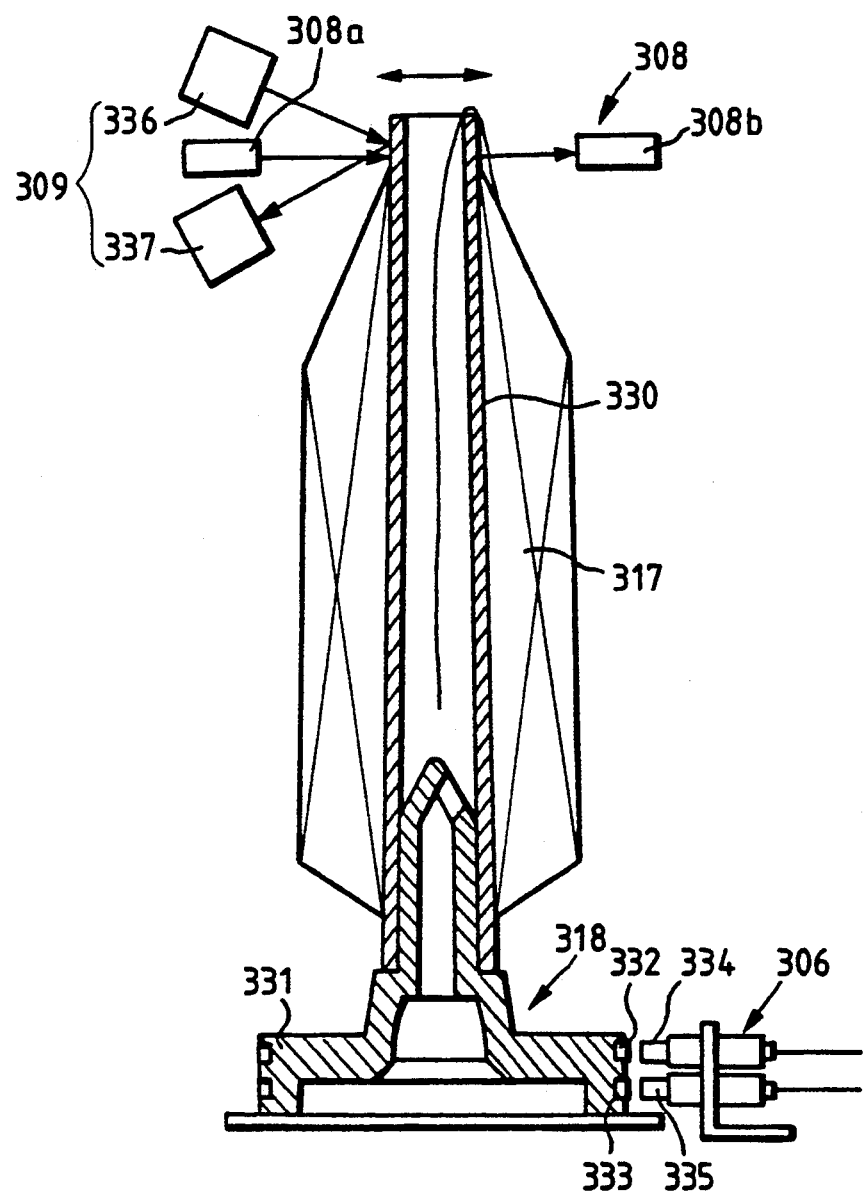
FIG. 22 is a view showing an example of arrangement of a tray sensor, a position sensor, and a bobbin color sensor.

Next, examples of the tray sensor 306, the position sensor 308 and the take-up tube color sensor 309 are shown in FIG. 22.

In FIG. 18, the bobbin 317 having a yarn wound on a color bobbin 330 has its lower end mounted on a tray 318 and held in an upright state, and is carried to the winder W by the tray 318. The tray sensor 306 for discriminating kinds of trays 318 or kinds of bobbins 317 is composed, in the example of FIG. 22, of proximity switches 334 and 335 which detect discrimination marks comprising a plurality of iron rings 332, 333 provided in the pripheral surface of a disc-like base body 331 of the tray 318. The position sensor 308 for obtaining a position of a passing bobbin, i.e., mixed-count discriminating timing is composed of a projector 308a and a light receiver 308b, a light path of which is shielded by an upper portion of the take-up tube 330 whereby the bobbin is detected. The bobbin color sensor 309 for discriminating kinds of colors of the take-up tube 330 or counts of the bobbin 317 is specifically composed of a projector 336 for irradiating light against the peripheral surface of the upper end of the bobbin 302, a light receiver 337 for receiving the reflected light, and an electric circuit portion (see FIG. 24) for receiving a signal from the light receiver 337 to discriminate colors of the bobbin.

The position sensor 308 and the bobbin color sensor 309 which constitute the mixed-count detector are operated as follows. When the bobbin 317 which circulates the circulating distribution passage 304 arrives at the position of the mixed-count detector, the light path of the position sensor 308 is shielded by the side of the take-up tube 330 of the bobbin 317, and the bobbin color sensor 309 assumes a position at which a diameter line of the color take-up tube 330 can be seen. At this time, color of the take-up tube 330 is read by the bobbin color sensor 309, and suitability of color whether or not that color is color which should belong to the winding sections SC1 to SC5 is judged by a mixed-count detector circuit (decision circuit 351 in FIG. 25). That is, colors to be detected by the bobbin color sensor 309 are predetermined for each winding sections SC1 to SC5. When the color bobbin 330 having a color different from the predetermined color, judgement is made as a state where a bobbin which is supposed to be moved to the other winding section is erroneously mixed, i.e., mixed-count.

Figure 23:
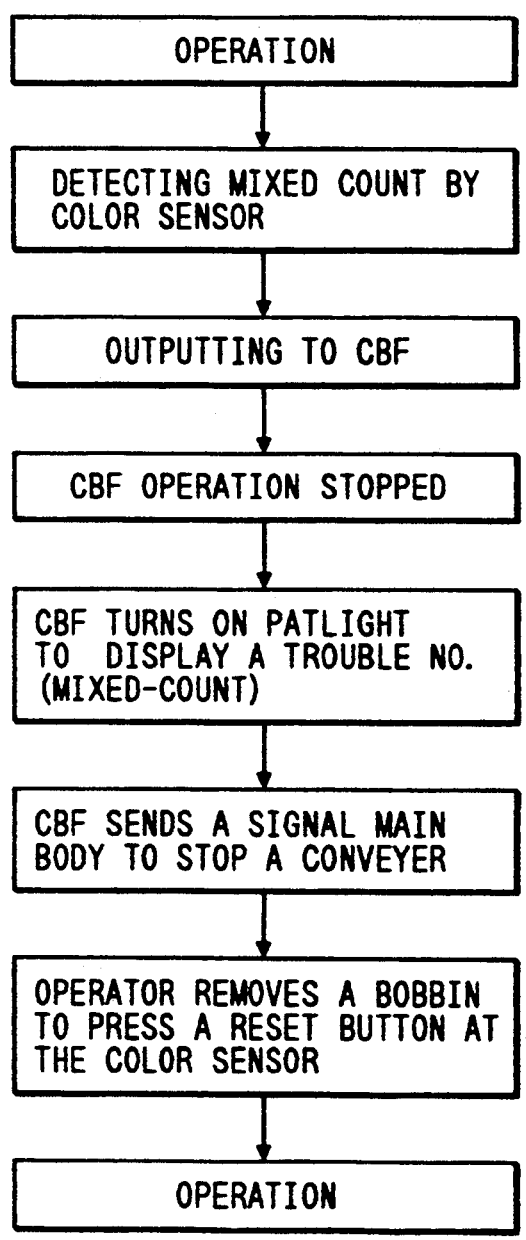
FIG. 23 is a schematic view showing a control procedure of the mixed-count prevention apparatus according to the present invention.

As shown in FIG. 23, when a mixed-count caused by the bobbin color sensor 309 is detected, a mixed-count detection signal is transmitted to the yarn end finding device 312, operation of which is stopped. The carrier system of the yarn end finding device 312 is, since an independent disk is rotated, to stop a supply of a new bobbin from the yarn end finding device 312 to prevent clogging of the bobbin on the carrier line 302.

Upon receipt of the mixed-count detection signal, the yarn end finding device 312 stops the aforementioned operation and on the other hand, turns on an alarm lamp provided thereon or on a sizing device, for example, PATLIGHT (product name) to display a trouble number, i.e., a name of the winding section for which the mixed-count is detected. Upon receipt of a mixed-count detection signal, the yarn end finding device 312 sends a signal to the sizing device body of the winder W to stop the whole carrier system of the winder W, that is, a series of carrier systems including the carrier line 302, the bobbin supply passage 303 and the circulating distribution passage 304. Since the conveyor is provided which extends through the whole winder, the carrier system of the whole winder is merely stopped, and if the conveyor is independently provided for each of the winding sections SC1 to SC5, the conveyor for the winding section to which the bobbin color sensor 309 which detected the mixed-count belongs can be independently stopped.

By the aforementioned control, an operator finds a bobbin on the color bobbin of different color mixed in the circulating distribution passage 304 of the indicated winding section out of bobbins in the stopped carrier system, and said bobbin is removed from the tray 18 and thereafter presses a reset button provided on the color sensor portion. Thereby, the aforementioned alarm lamp is turned off to clear a display of the trouble number, and the stopped carrier system restarts its operation.

Incidentally, since the winding continues even if the conveyor stops, if an operator fails to process for a long period of time, the bobbin 317 becomes gone in the winding unit 301. Thus, the operation of failure of yarn joining is repeated, and at the third time, the yellow button 327 projects, providing a joining disable display state. Accordingly, when the yellow buttons are projected in many winding units, an operator has to perform an extra work, when the operation restarts, of depressing the yellow button for the individual winding units. Therefore, in the case where the operation of the carrier system does not restart even a predetermined set time has passed after the carrier system stopped, it is necessary to impart a joining inhibit instruction so that the winder will not perform the yarn joining operation.

Figure 24:
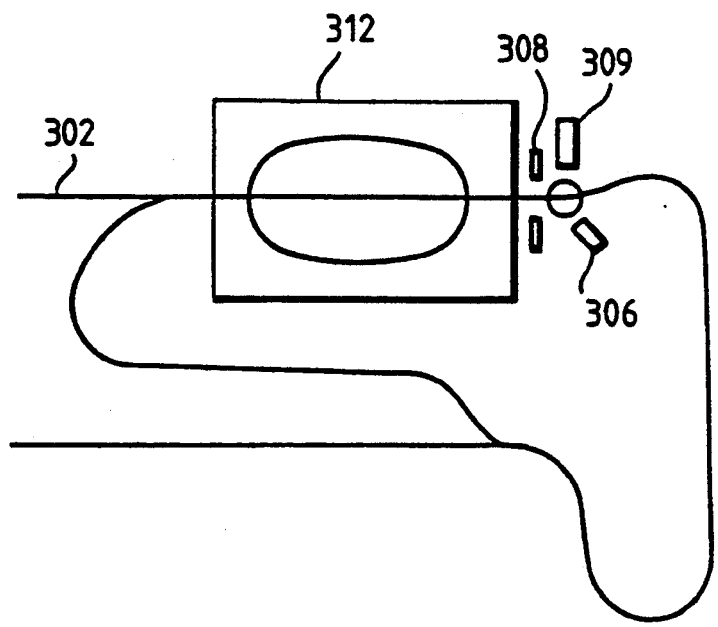
FIG. 24 is a schematic view showing a modified form of a system provided with a mixed-count prevention apparatus.

FIG. 24 shows an example in which upstream of the yarn end finding device 312 in the main carrier line 302 is arranged a mixed-count detector comprising the tray sensor 306, the position sensor 308 and the bobbin color sensor 309. This mixed-count detector detects suitability of a combination of colors of the tray 318 and the color bobbin 330 in the main carrier line 302, and in the case where a kind of yarn applied to the tray 318 is different from that which means color of the color bobbin 330, the detector judges it as a mixed-count and stop the carrier system of the whole winder similarly to the above to eliminate the bobbin 317 in which the combination of the tray 18 and the color take-up tube 330 is different. Thereby, the mixed-counts in connection with all the winding sections SC1 to SC5 are prevented in advance and in common.

However, the mixed-count detector merely detects suitability of the combination of the tray 318 and the color take-up tube 330 in colors and cannot decide whether or not the tray is properly incorporated in the predetermined winding sections SC1 to SC5. That is, a different kind of bobbin 317 is possibly incorporated in the circulating distribution passage 304 depending on the operation of the gate 307. Accordingly, even in this case, it is necessary to arrange a mixed-count detector for detecting color of the color take-up tube 330 in the circulating distribution passage 304.

Figure 25:
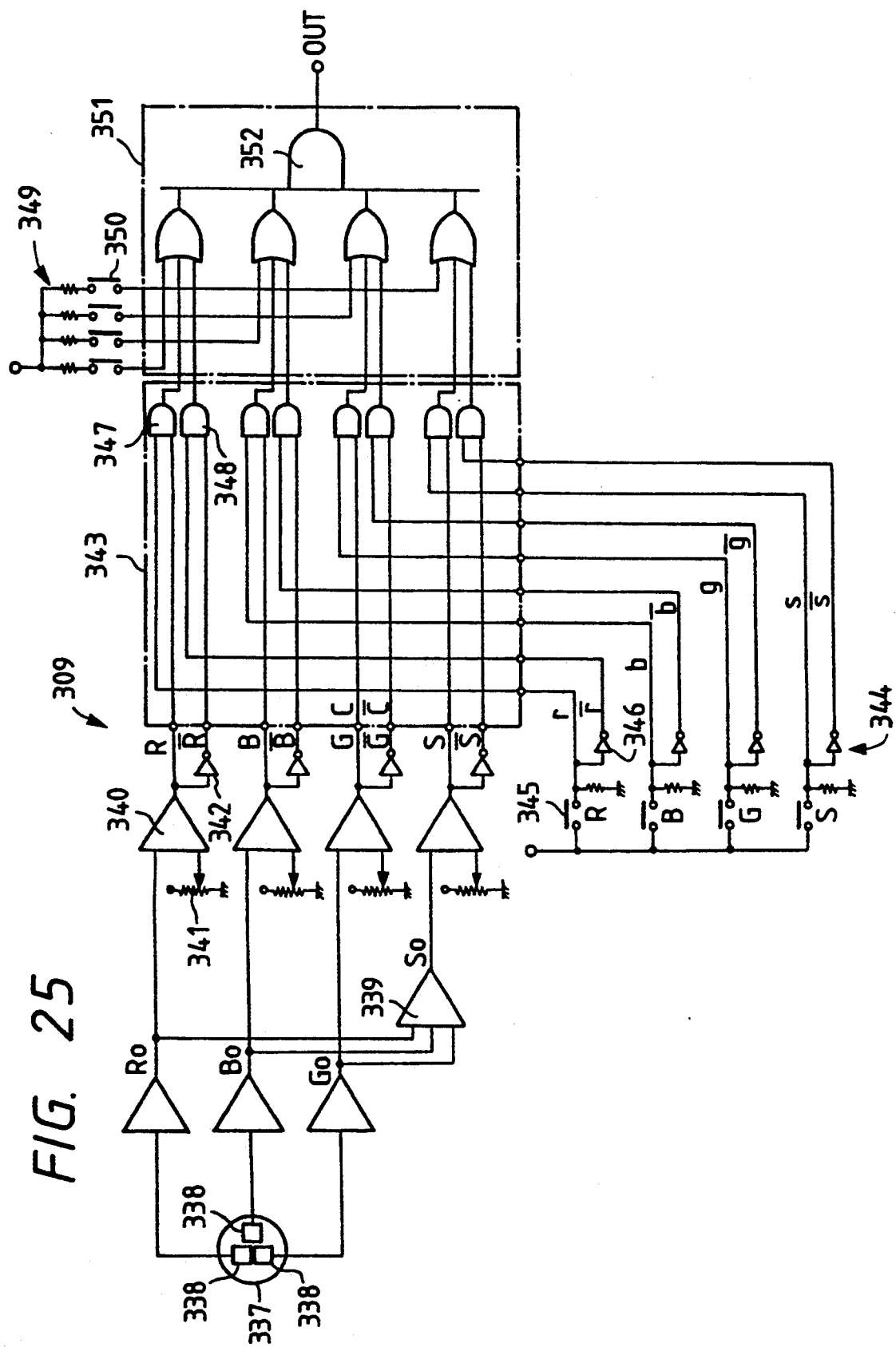
FIG. 25 is a view showing an example of construction of an electric circuit portion of a bobbin color sensor.

FIG. 25 shows an electric circuit portion of the bobbin color sensor 309.

In FIG. 25, reflected light from the color take-up tube 330 is separated into three original colors, red, blue and green, by three light receiving elements 338 of the light receiver 337, and a luminance portion So is removed, from an adder 339, as the sum of hue portions Ro, Bo and Go of red, blue and green, through an amplifier. These hue portions Ro, Bo and go and the luminance portion So are all analog signals, which are inputted into independent comparators 340.

Each of the comparators 340 compares these input signals Ro, Bo and Go with a set value predetermined by a level setter 341. In case where the input signals Ro, Bo, go and So are larger than the set value, color information signals R, B, G and S, "Color component is present", are outputted at a H level. An inverter 342 is connected to each of the comparators 342, and color information signals $\overline{RB}$, $\overline{G}$ and $\overline{S}$, "Color component is absent" in which the aforementioned color information signals R, B, G and S are inverted are outputted from each of the inverters 342.

The color information signals R, B and G, "Color component is present" with respect to hue components of red, blue and green are outputted when colors of the color take-up tube 330 are reddish, bluish and greenish colors more than the set value, and the color information S, "Color component is present" with respect to the luminance component is outputted when the whole color of the color bobbin 302 is color brighter than the set value, for example, color such as "pink", "bright green" and "pale blue". And, the color information signals $\overline{RB}$, $\overline{G}$ and $\overline{S}$, "Color component is absent", are outputted when components of red, blue, green and luminance are not contained in color of the color bobbin 302 to a fixed level. The transition of one output out of the color information signals R, B, G and S, "Color component is present", can be utilized as discrimination timing for detecting the color information signals $\overline{RB}$, $\overline{G}$ and $\overline{S}$, "Color component is absent".

Reference numeral 343 designates a color information selection circuit wherein in discrimination whether or not two colors of the color bobbin, that is, kinds of bobbin, correct for the winder unit, color information of four systems, the aforesaid red, blue, green and luminance, eight color information signals, R, B, G, S, $\overline{RB}$, $\overline{G}$ and $\overline{S}$ are selected or combined to decide whether judgement and processing take place. Reference numeral 44 designates a color system designation circuit for designating color systems to be used for selection and combination, that is, discrimination of the aforesaid four systems in the color information selection circuit 343, eight color information signals R, B, G, S, $\overline{RB}$, $\overline{G}$ and $\overline{S}$. This circuit is provided with independent color system designation switches 345 corresponding to four systems, red, blue, green and luminance. Designation signals r, b, g, and s for designating "Color component is present" of red, blue, green and luminance are removed at a H level from each of the color system designation switches 345. An inverter 346 is connected to each of the color system designation switches 345. Designation signals $\overline{r}$, $\overline{b}$, $\overline{g}$, and $\overline{s}$ for designating "Color component is absent" of red, blue, green and luminance obtained by inverting the aforesaid signals r, b, g and s are outputted at a H level from each of the inverters.

In the case where one of the color system designation switches 345, for example, the R color system designation switch is turned ON to designate red, AND gate 347 belonging to the thus designated red system is opened by a designation signal. At this time, the designation signal $\overline{r}$ remains at an L level, and therefore, AND gate 48 is in the closed state. With respect to the remaining color system designation switches 345 not turned ON, a group of AND gates 347 are closed, and a group of AND gates 48 are opened by the designation signals $\overline{b}$, $\overline{g}$, and $\overline{s}$. That is, among four system and eight color information siganls R, B, G, S, $\overline{RB}$, $\overline{G}$ and $\overline{S}$, four systems and four color information signals $\overline{RB}$, $\overline{G}$ and $\overline{S}$ are removed. This results from the fact that as color for discriminating the color bobbin 302 which is the object for inspection, color of "red color system" which has hue of red and has no color information of blue, green and luminance is designated by the color system designation circuit 344. In the case where the number of the color system designation switches 322 is increased, and for example, the color system designation switches 322 and 323 are turned ON to designate red and blue, four systems and four color information signals R, B, $\overline{G}$ and $\overline{S}$ are removed, and color of "purple color system" which has hue of red and blue and has no color information of green and luminance can be designated. In a similar manner, various color systems can be designated.

Reference numeral 349 designates a color information elimination designation circuit for eliminating a color information signal of a color system which is not desired to be used among four systems and four color information signals to be removed from the color information selection circuit 343. This circuit is provided with independent manual elimination switch 350 for each system of red, blue, green and luminance. For example, in the case where four systems and four color information signals removed from the color information selection circuit 343 are the aforementioned four signals R, $\overline{B}$, $\overline{G}$ and $\overline{S}$, when only three elimination switches 350 on the right side are turned ON, three color information signals $\bar{B}$, $\bar{G}$ and $\bar{S}$ of blue, green and luminance are removed, which are ignored from judging elements, and only the color information signal R with respect to the elimination switch 350 on the left end not turned ON remains as an effective processing signal. Color designation of pur "red color system" whether or not red hue is present can be designated.

Reference numeral 350 designates a decision circuit for discriminating whether or not color of the color bobbin is correct. This circuit receives, as color information for final decision and processing, color information signals of four systems removed from the color information selection signal 320 or color information signals of 3 to 1 systems eliminated by the color information elimination designation circuit, and discriminates whether or not color of the color bobbin 302 is correct on the basis of the color information signals of the 4 to 1 systems.

Next, the operation will be described referring to the FIG. 20 form as an example.

For convenience sake of description, it is assumed that two kinds, "red" and "purple", of color bobbins 302 are used, a yarn of count 314 and a yarn of count 316 are wound on the red bobbin and the purple bobbin, respectively, and both the color bobbins 302 are supplied to the circulating distribution passage 304 of separate winding units SC1 and SC2. In such a case, in order to discriminate whether or not the color bobbins 330 are correct color bobbins for the winding units SC1 and SC2, it is necessary to discriminate and decide two kinds of colors, "red" and "purple" of the color bobbins 330. However, the problem is that since red and purple contain red as a common hue, accurate discrimination cannot be made by a method for discriminating the success or failure of both the color bobbins 302 with the presence or absence of color component of red as a difference. On the other hand, a color component of "blue" which is contained in "purple" of one color bobbin 302 but not contained in "red" of the other color bobbin 302 is used as a barometer for deciding the success or failure of the color bobbin 302.

First, with respect to the first winding unit SC1 which handles the red bobbin (yarn of count 14), detection of the fact that the "blue" color component is not present to a fixed level, accordingly, occurrence of the color information signal $\bar{B}$, comprises the deciding condition that it is a correct color bobbin. However, the output of the inverter 342 of $\bar{B}$ is at a H level even if the color take-up tube 330 is not yet at the position of the bobbin color sensor 309 and the color information signal $\bar{B}$ is generated. Therefore, the second condition as discriminating timing for judging the success or failure of the aforesaid condition at a suitable time. The second condition is fulfilled if the arrival of the color take-up tube 330 at the position of the bobbin color sensor 309 is detected by the position sensor 308 separately provided. Alternatively, the information signal S of luminance is utilized whereby the arrival of the color take-up tube 330 at the position of the bobbin color sensor 309 can be judged with the generation of the information signal S of the luminance.

Then, by turning ON the color system designation switch 345 of the luminance S in the color system designation circuit 344, the color information signal S to the effect that a color component of luminance is present is designated. The color system designation switch 345 of blue B is maintained at OFF state, whereby the color information signal $\bar{B}$ to the effect that a color component of blue is absent is designated by the designation signal $\bar{b}$. Then, the elimination switches of the red system and green system of the color information elimination designation circuit 349 are turned ON to always retain input terminals of the red and green systems in the 4-input AND gate 352 of the decision circuit 351 and remove the color information signals R, $\bar{R}$ of the red system and the color information siganls G, $\bar{G}$ of the green system from the judging elements for decision.

By setting as described above, only in the case where the color information signals S and B are simultaneously inputted, that is, only in the case where the red bobbin on which yarn of count 314 is wound, the AND gate 352 of the decision circuit 351 causes its output terminal to handle the output at a H level as a detection signal to the effect that color of the color bobbin 302 is correct. If the purple bobbin on which yarn of count 16 is wound erroneously arrives, the color information signal B of blue is outputted in the comparator 340 and the color information signal $\bar{B}$ which is an inverted signal thereof disappears, and therefore, logic of the AND gate 352 is not established, and the output thereof assumes an L level.

The output at the L level of the AND gate 352 is handled as a conveyor stop signal of the main carrier line 302 for the purpose of removing the color take-up tube 330 from the carrier system by the operator.

Next, with respect to the second winding unit SC2 which handles the yarn (purple bobbin) of count 16, detection of the fact that a color component of "blue" is present at a fixed level, that is, generation of the color information signal B comprises the decision condition to the effect that it is correct color bobbin. The second condition in connection with the descrimination timing handled in the first winding unit SC 1, that is, the condition that the color take-up tube 330 arrives at the position of the bobbin color sensor 309 is not always necessary as the decision condition that it is a correct color bobbin but is necessary to give a judgement that it is an incorrect color bobbin.

In this connection, with respect to the second winding unit, setting is made as follows.

First, the color system designation switch 345 (B) of blue is turned ON, and the color information signal B to the effect that a color component of blue is present is designated by the designation signal $\bar{b}$. The color system designation switch (S) of luminance is turned ON, and the color information signal S to the effect that a color component of luminance is present is designated by the designation signal s. Further, the elimination switches 350 (red and blue) of the color information elimination designation circuit 350 are selectively turned ON to always retain at the H level inputs of the red and green systems of the decision circuit 51 and remove the color information signals $\bar{R}$, R, $\bar{G}$ and G of the red and green systems from the judging elements for decision.

By setting as described above, only in the case where the color information signals S and B are simultaneously inputted, that is, only in the case where a purple bobbin on which yarn of count 16 is wound arrives, the AND gate 352 of the decision circuit 351 causes its output terminal to assume a H level. If a red bobbin of count 14 erroneously arrives, the color information signal B of blue disappears in the comparator 340 (B), and therefore, the output of the AND gate 352 assumes an L level. Accordingly, when the output of the AND gate 352 is at a H level, it is a correct purple bobbin of count 16, and therefore the bobbin is caused to pass, whereas when at an L level, it is a red bobbin of count 14 erroneously sent, and therefore, the bobbin is caused to be discharged from the carrier system to stop the main carrier line 302.

While in the foregoing, red and purple bobbins have been employed as examples, it is to be noted that the manner of discriminating color bobbins of suitable color having the same hue components is similar. Color components which can be easily discriminated among color components of red, blue, green and luminance are used as discrimination colors whereby both the color bobbins can be discriminated without error and detected. Mostly, color components which can be easily discriminated to be used as discrimination colors are hue components not common to both the color bobbins. However, color components of luminance as in white and black are sometimes easily discriminated, and therefore, the color components of luminance are included in color components which are easily discriminated. Anyway, color components which are easily discriminated different from color of the actual color bobbin are used as discrimination colors whereby even the bobbin colors of the same color system can be discriminated and detected without error.

As described above, according to the present invention, when color different from color of yarn handled by the winding section is detected by the color sensor, the operation of the circulating distribution passage of the winding section is stopped, and therefore, the bobbin mixed can be removed by the operator. Therefore, a trouble wherein a yarn of separate kind is mixed in the package and wound may be prevented.

What is claimed is:

1. A bobbin sorting system comprising:
   a plurality of bobbin supporting trays defining a plurality of different colors,
   a color sensor for sensing the color of the trays,
   a metal plate associated with each tray having only one of the plurality of different colors, and
   detection means provided adjacent the color sensor for detecting the metal plate.

2. The bobbin sorting system of claim 1, wherein the metal plate comprises an annular metal plate and the trays having only one of the plurality of colors comprise a disc having an annular recess configured to receive the annular metal plate.

3. The bobbin sorting system of claim 1, wherein the detection means comprises a proximity switch.

4. A bobbin sorting system, comprising:
   a plurality of bobbin supporting trays, at least some, but fewer than all of the bobbin supporting trays comprising a metal plate, the bobbin supporting trays comprising a metal plate defining first bobbin supporting trays, bobbin supporting trays not comprising a metal plate defining second bobbin supporting trays, the second bobbin supporting trays being associated with a plurality of different colors, and the first bobbin supporting trays being associated with a color different than the colors associated with the second plurality of trays,
   first discriminating means for distinguishing the first bobbin supporting trays from the second bobbin supporting trays by sensing the metal plates associated with the first bobbin supporting trays, and
   color discriminated means for discriminating among the second bobbin supporting trays based upon the colors associated with the second bobbin supporting trays.

* * * * *

UNITED STATES PATENT AND TRADEMARK OFFICE
CERTIFICATE OF CORRECTION

PATENT NO.   :   5,279,729
DATED        :   January 18, 1994
INVENTOR(S)  :   SHOICHI TONE, et al.

It is certified that error appears in the above-identified patent and that said Letters Patent is hereby corrected as shown below:

On title page, item [75] Inventors: the fifth inventor last name should read --Nakagawa--

Signed and Sealed this

Fourteenth Day of June, 1994

Attest:

BRUCE LEHMAN

Attesting Officer            Commissioner of Patents and Trademarks